(12) United States Patent
Gill et al.

(10) Patent No.: US 8,407,972 B2
(45) Date of Patent: Apr. 2, 2013

(54) APPARATUS AND METHOD FOR SEALING A CONTAINER

(75) Inventors: Mark Gill, London (GB); Paul Gill, London (GB); Richard William Adams, Puckeridge (GB); Daniel Vanko, Watford (GB); Keith Leslie Harman, London (GB)

(73) Assignee: Relco UK Ltd, Watford (GB)

( * ) Notice: Subject to any disclaimer, the term of this patent is extended or adjusted under 35 U.S.C. 154(b) by 443 days.

(21) Appl. No.: 12/778,079

(22) Filed: May 11, 2010

(65) Prior Publication Data

US 2010/0287892 A1 Nov. 18, 2010

(30) Foreign Application Priority Data

May 14, 2009 (GB) .................................. 0908238.9

(51) Int. Cl.
*B65B 7/01* (2006.01)
*B65B 7/16* (2006.01)
*B65B 51/22* (2006.01)

(52) U.S. Cl. ............. 53/478; 53/487; 53/297; 53/329.3; 53/329.5; 53/DIG. 2

(58) Field of Classification Search .................... 53/478, 53/487, 296–298, 329.2, 329.3, DIG. 2; 156/69; B65B 7/01, 7/16, 51/22
See application file for complete search history.

(56) References Cited

U.S. PATENT DOCUMENTS

| | | | | |
|---|---|---|---|---|
| 1,652,595 A | * | 12/1927 | Weeks et al. ..................... | 53/297 |
| 1,708,828 A | * | 4/1929 | Bremmerman .................. | 156/69 |
| 2,202,006 A | * | 5/1940 | Hothersall .................... | 53/329.2 |
| 3,346,435 A | * | 10/1967 | Beck .............................. | 156/69 |

(Continued)

FOREIGN PATENT DOCUMENTS

| EP | 39660 A1 | * | 11/1981 |
|---|---|---|---|
| EP | 0223517 A2 | | 5/1987 |

(Continued)

OTHER PUBLICATIONS

United Kingdom Search Report for GB 0908238.9, Jul. 29, 2009, 1 page.

(Continued)

*Primary Examiner* — Stephen F Gerrity
(74) *Attorney, Agent, or Firm* — Chernoff Vilhauer McClung & Stenzel LLP

(57) ABSTRACT

A container sealing apparatus 10 comprises an electrically conductive linearly displaceable cutting member 14 operable to cut a portion 18 of sealing material from a web 16 and an independently linearly displaceable transfer member 42 comprising an electrically insulating material and extendible relative to the cutting member 14 to transfer the cut portion 18 of sealing material to an open top of a container 12 to be sealed. An induction coil 52 produces an induction field 54 for heating the cut portion 18 of sealing material, either directly or indirectly, by induction heating to seal the cut portion 18 of sealing material to the open top of the container 12. The linearly displaceable transfer member 42 holds the cut portion 18 of sealing material against the open top of the container 12 during induction heating. A field concentrator 56 is provided to concentrate the induction field 54 in a desired region away from the linearly displaceable electrically conductive cutting member 14 and other electrically conductive component parts of the apparatus 10 to optimize the induction heating of the cut portion 18 of sealing material.

21 Claims, 4 Drawing Sheets

U.S. PATENT DOCUMENTS

| | | | | |
|---|---|---|---|---|
| 3,548,140 | A * | 12/1970 | O'Neill | 53/478 |
| 3,792,566 | A * | 2/1974 | Kinney | 53/298 |
| 3,808,074 | A | 4/1974 | Smith et al. | |
| 3,884,017 | A * | 5/1975 | Butcher | 53/296 |
| 3,927,506 | A * | 12/1975 | Abd-Alla | 53/487 |
| 4,380,484 | A | 4/1983 | Repik et al. | |
| 4,625,498 | A * | 12/1986 | Parsons | 53/298 |
| 4,719,739 | A | 1/1988 | Foldesi | |
| 4,736,568 | A * | 4/1988 | Shaw et al. | 53/297 |
| 4,816,110 | A * | 3/1989 | Foldesi et al. | 53/DIG. 2 |
| 4,982,555 | A * | 1/1991 | Ingemann | 53/478 |
| 6,552,312 | B2 * | 4/2003 | Hammen et al. | 156/69 |
| 6,637,491 | B2 * | 10/2003 | Massey et al. | 156/69 |
| 2004/0200194 | A1 | 10/2004 | Sarles | |
| 2004/0206048 | A1 * | 10/2004 | Iuchi et al. | 53/329.2 |
| 2007/0245867 | A1 | 10/2007 | Gill et al. | |

FOREIGN PATENT DOCUMENTS

| | | | |
|---|---|---|---|
| EP | 469296 | A1 * | 2/1992 |
| EP | 1357025 | A2 | 10/2003 |
| EP | 1990281 | A2 * | 11/2008 |

OTHER PUBLICATIONS

European Search Report for EP 10004920, Aug. 25, 2010, 4 pages.

* cited by examiner

APPARATUS AND METHOD FOR SEALING A CONTAINER

CROSS-REFERENCE TO RELATED APPLICATION

This application claims priority under 35 USC 119 of United Kingdom Patent Application No. GB 0908238.9, filed May 14, 2009.

BACKGROUND OF THE INVENTION

The present invention relates generally to container sealing apparatus and/or to a method for sealing a container. Embodiments of the present invention are concerned particularly with the use of induction heating to apply sealing material to an open top of a container to seal the container.

Induction sealing machines can be used to apply sealing material to the open tops of a variety of containers to seal the containers. In one currently available machine, a ceramic cutting punch is used both to cut a portion of sealing material from a web and to transfer the cut portion of sealing material to the container in a single stroke. The cut portion of sealing material is then inductively heated whilst held against the open top of the container by the cutting member.

The use of ceramic material is advantageous since it is extremely hardwearing. Moreover, when the electrical induction coil is activated to heat the cut portion of sealing material, the cutting punch is not itself inductively heated provided that the ceramic material is electrically insulating. This ensures that there is no thermal expansion of the cutting punch and that the induction energy is not wasted by being drawn into the cutting punch.

Ceramic materials are not, however, suitable for use in situations where the sealing geometry is complex since it becomes economically unfeasible to manufacture a ceramic cutting punch with the required geometry. The use of a ceramic cutting punch can also be problematic when sealing glass containers since any misalignment between the cutting punch and container could cause the container to shatter when the cutting punch presses the cut portion of sealing material onto the rim of the container. It would, therefore, be desirable to provide an apparatus and method for sealing a container which can be used in situations for which the induction sealing machine outlined above, employing a ceramic cutting punch, and similar machines are not ideally suited.

SUMMARY OF THE INVENTION

According to a first aspect of the present invention, there is provided container sealing apparatus comprising a linearly displaceable cutting member operable to cut a portion of sealing material from a web, the linearly displaceable cutting member comprising an electrically conductive material; an independently linearly displaceable transfer member extendible relative to the cutting member to transfer the cut portion of sealing material from the linearly displaceable cutting member to an open top of a container to be sealed, the linearly displaceable transfer member comprising an electrically insulating material; an induction coil which is operable to produce an induction field for heating the cut portion of sealing material, either directly or indirectly, by induction heating to enable the cut portion of sealing material to be sealed to the open top of the container, the linearly displaceable transfer member being operable to hold the cut portion of sealing material against the open top of the container during induction heating; and a field concentrator operable to concentrate the induction field in a desired region away from the linearly displaceable electrically conductive cutting member to optimize the induction heating of the cut portion of sealing material.

According to a second aspect of the present invention, there is provided a method for sealing a container, the method comprising cutting a web of sealing material, using a linearly displaceable cutting member formed of electrically conductive material, to provide a cut portion of the sealing material; transferring the cut portion of sealing material to an open top of a container to be sealed by extending an independently linearly displaceable transfer member relative to the linearly displaceable cutting member, the linearly displaceable transfer member comprising an electrically insulating material; inductively heating the cut portion of sealing material, either directly or indirectly, to seal the cut portion of sealing material the open top of the container whilst held against the open top of the container by the transfer member; wherein the step of inductively heating the cut portion of sealing material comprises producing an induction field using an induction coil and concentrating the induction field, using a field concentrator, in a desired region away from the linearly displaceable electrically conductive cutting member to optimize the induction heating of the cut portion of sealing material.

By concentrating the electrical induction field generally in the region of the cut portion of sealing material and away from the linearly displaceable electrically conductive cutting member, undesirable induction heating of the linearly displaceable electrically conductive cutting member is minimized or prevented. Thermal expansion of the electrically conductive cutting member is thus also minimized or prevented, avoiding potential fouling of the cutting member with the associated component parts of the container sealing apparatus. Because the transfer member is formed from an electrically insulating material, the transfer member is not inductively heated by the induction field.

The field concentrator thus effectively acts as a shield, preventing the magnetic induction field from heating unwanted electrically conductive component parts of the container sealing apparatus.

In addition to minimizing or preventing undesirable induction heating of the electrically conductive cutting member, induction heating of other electrically conductive component parts of the container sealing apparatus is also advantageously minimized or prevented by the field concentrator. The efficiency of the induction heating process is thus maximized, enabling rapid induction heating (either directly or indirectly), and thereafter rapid cooling, of the cut portion of sealing material to seal the open top of the container.

The field concentrator may be mounted on the transfer member. The induction coil may be mounted generally adjacent to the field concentrator. The induction coil may be mounted on the transfer member or on the field concentrator.

The transfer member may include a transfer surface for transferring the cut portion of sealing material to the open top of the container. The field concentrator may be arranged to concentrate the induction field in a region generally around the transfer surface. Since the cut portion of sealing material is carried by the transfer surface, the induction field is thus concentrated in the region of the cut portion of sealing material.

The transfer member may include a distal end at which the transfer surface may be provided. The field concentrator and the electrical induction coil may be positioned generally at, or towards, the distal end of the transfer member.

The field concentrator may comprise a magnetic material and may comprise ferrite.

The cutting member may be generally tubular and may include a passage through which the transfer member may be linearly displaceable, relative to the cutting member. The transfer member may be linearly displaceable between a retracted position and an extended position.

The cutting member may include an annular cutting surface and the transfer surface may be generally flush with the cutting surface when the transfer member is in the retracted position. Alternatively, the transfer surface may be recessed from the cutting surface when the transfer member is in the retracted position. The transfer surface may project beyond the cutting surface when the transfer member is in the extended position.

The apparatus may include a holding arrangement operable to hold the cut portion of sealing material on the transfer member during transfer of the cut portion of sealing material to the open top of the container by the transfer member for sealing to the open top of the container. The holding arrangement may additionally be operable to hold the cut portion of sealing material on the transfer member during movement of the cutting member from the first position to the second position.

The holding arrangement may comprise a vacuum arrangement. The vacuum arrangement may be operable to apply suction to the transfer surface of the transfer member to hold the cut portion of sealing material in position on the transfer surface.

The electrically conductive material from which the cutting member is formed may comprise a metallic material. The metallic material may comprise steel, for example tool steel. The electrically insulating material from which the transfer member is formed may comprise a plastics material.

The transfer surface may include a flexible plate member to enable the transfer surface to conform generally to the shape of the open top of a container when in contact with the container in use. The flexible plate member may comprise a resiliently deformable material.

The apparatus may be adapted for use with sealing material comprising an electrically conductive sealing material. The induction field produced by the induction coil may thus be operable to directly inductively heat the cut portion of electrically conductive sealing material.

The apparatus may alternatively be adapted for use with sealing material comprising an electrically insulating sealing material and the transfer surface may comprise an electrically conductive material which is arranged to be inductively heated by the induction field produced by the induction coil. The cut portion of electrically insulating sealing material may thus be indirectly inductively heated by the induction coil.

The apparatus may be adapted for use with sealing material carrying a thermosensitive adhesive which may be softened or melted by the direct or indirect induction heating to thereby seal the cut portion of sealing material to the open top of the container.

In the method according to the second aspect of the present invention, the induction heating step may comprise concentrating the induction field in a desired region generally around the cut portion of sealing material.

The method may comprise linearly displacing the cutting member from a first position to second position to cut the web of sealing material and provide the cut portion of sealing material.

The method may comprise extending the transfer member relative to the cutting member when the cutting member is in the second position, to thereby transfer the cut portion of sealing material to the open top of the container. The method may comprise maintaining the transfer member in the extended position for a predetermined period of time.

The method may comprise activating the induction coil to inductively heat the cut portion of sealing material, either directly or indirectly, during an initial portion of the predetermined period of time and may thereafter comprise deactivating the induction coil during the remainder of the predetermined period of time. It is during this remainder of the predetermined period of time, following deactivation of the induction coil, that the cut portion of sealing material, and hence the thermosensitive adhesive, rapidly cools. The adhesive typically cures vary rapidly upon cooling, thereby sealing the cut portion of sealing material to the open top of the container.

The method may comprise positively holding the cut portion of sealing material on the transfer member, for example using the aforesaid vacuum arrangement, during transfer of the cut portion of sealing material to the open top of the container by the transfer member. The method may additionally comprise positively holding the cut portion of sealing material on the transfer member during movement of the cutting member from the first position to the second position.

The method may comprise displacing the transfer member from the extended position to a retracted position following sealing of the cut portion of sealing material to the open top of the container and may thereafter comprise displacing the cutting member from the second position to the first position.

In embodiments where the sealing material comprises an electrically conductive sealing material, such as a metallic foil, the method may comprise directly inductively heating the cut portion of electrically conductive sealing material.

In embodiments where the sealing material comprises an electrically insulating sealing material, the method may comprise indirectly inductively heating the cut portion of electrically insulating sealing material. The step of indirectly inductively heating the cut portion of electrically insulating sealing material may comprise inductively heating an electrically conductive transfer surface of the transfer member. Heat generated in the electrically conductive transfer surface by induction heating may then be transferred, typically by conduction, from the electrically conductive transfer surface to the cut portion of electrically insulating sealing material to thereby heat the cut portion of sealing material. Any thermosensitive adhesive carried by the electrically insulating sealing material may thus be softened or melted, thus enabling the cut portion to be adhered to the open top of the container.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Embodiments of the present invention will now be described by way of example only and with reference to the accompanying drawings.

Figure 5:
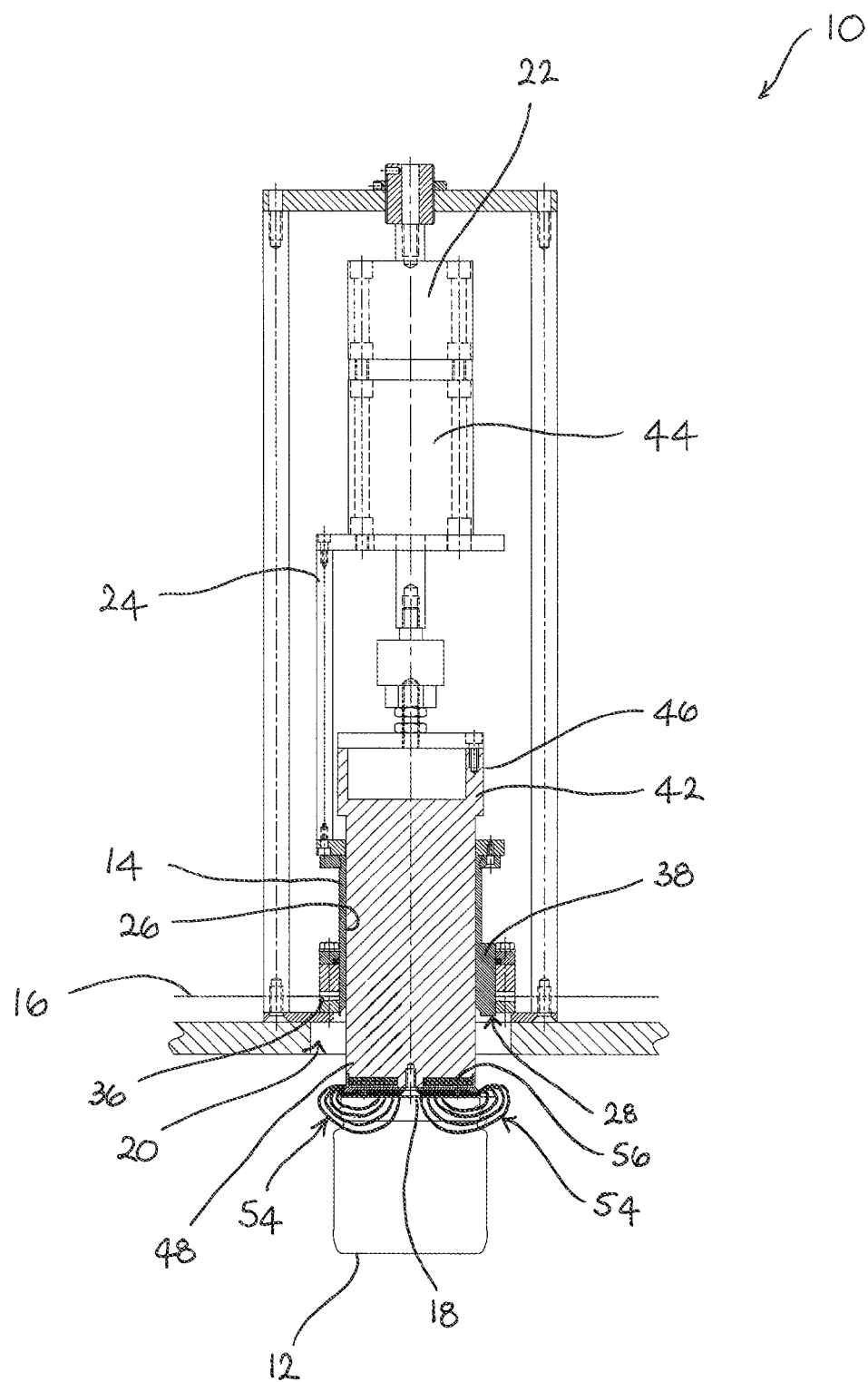
FIG. 5 is a diagrammatic cross-sectional view of the container sealing apparatus of FIG. 1, and an associated container, in a third configuration.

Referring to the drawings, there is shown a container sealing apparatus 10 for sealing an open top of a container 12 (see FIG. 5). The apparatus 10 can be used to seal containers 12 formed from a variety of materials, such as glass or plastics, having a variety of geometries and intended for a variety of end uses.

Figure 1:
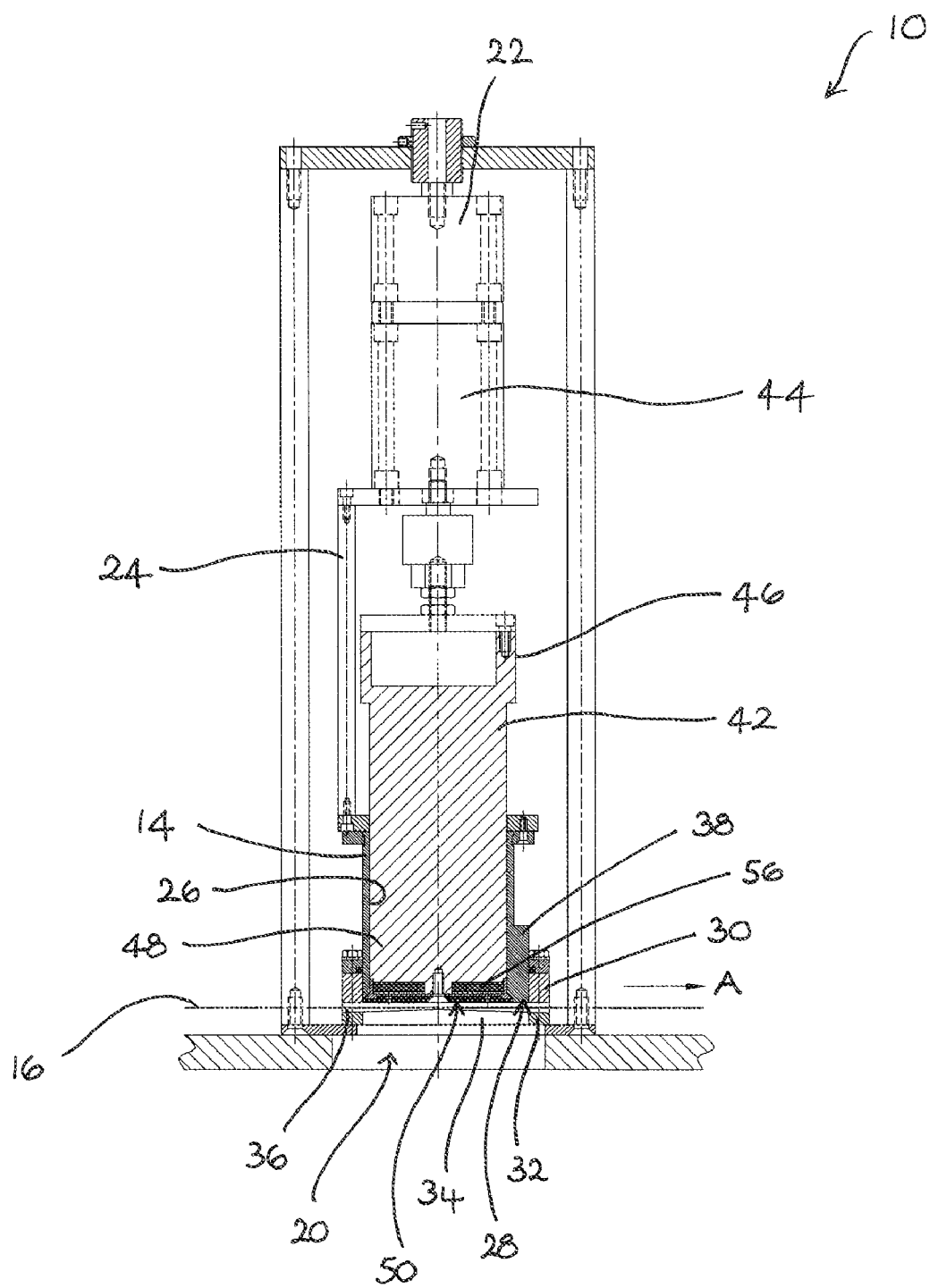
FIG. 1 is a diagrammatic cross-sectional view of one embodiment of a container sealing apparatus in a first configuration.

The apparatus 10 comprises a cutting member 14 which is linearly displaceable between a first position shown in FIG. 1 and a second position shown in FIG. 5. During movement from the first position to the second position, the cutting member 14 cuts a portion of sealing material from a web 16 of sealing material to provide a cut portion 18 of sealing material for sealing to the open top of the container 12. The web 16 of sealing material is typically provided on a supply reel (not shown) and extends through a cutting and sealing region 20 of the apparatus 10 in which it is cut by the cutting member 14 and thereafter sealed to the open top of the container 12. The resulting waste web 16 is then taken up on a waste reel (not shown). In the illustrated embodiment, the web 16 of sealing material comprises an electrically conductive metallic foil carrying a thermosensitive adhesive on its lower surface which seals the cut portion 18 of sealing material to the open top of the container 12 to thereby seal the container 12.

Although not shown in FIG. 5, a series of containers 12, which may for example be mounted on a suitable conveyor, are sequentially transported to the cutting and sealing region 20 to bring each container 12 sequentially into position below the cutting member 14. The container sealing apparatus 10 is operated, for example by a suitable control system, to periodically advance the web 16 of sealing material in the direction of arrow A in FIG. 1 so that a fresh portion of the web 16 and a new container 12 to be sealed are advanced, typically simultaneously, into the cutting and sealing region 20.

Linear displacement of the cutting member 14 between the first and second positions is effected by a first actuator 22, typically in the form of a piston arrangement, and a rigid connecting member 24 is provided to transmit the linear movement of the first actuator 22 to the cutting member 14. The cutting member 14 is generally in the form of a tubular cutting punch and has an elongate centrally located cylindrical passage 26. The cutting member 14 includes a generally annular or circumferential cutting surface 28 (best seen in FIG. 5) which cooperates with first and second cutting plates 30, 32 acting as a die and defining a cutting passage 34. The web 16 of sealing material is fed from the supply reel to the waste reel through a web transport passage 36 between the first and second cutting plates 30, 32. The co-operation between the annular cutting surface 28 and the first and second cutting plates 30, 32 enables the cutting member 14 to cut a portion of sealing material from the web 16 in the cutting and sealing region 20 to provide the cut portion 18 of sealing material.

The cutting member 14 is formed from an electrically conductive material. The electrically conductive material typically comprises a metallic material such as tool steel. In the illustrated embodiment, it will be seen that the cutting member 14 includes a tab projection 38 to enable the cut portion 18 of sealing material to be provided with a release tab 40 (see FIG. 4) to facilitate release of the cut portion 18 of sealing material from the container 12 by an end user. When a cutting member 14 with a relatively complex geometry such as tab projection 38 is needed, it is useful to be able to form the cutting member 14 from tool steel since the required geometry can be formed with reasonable ease, and thus at a reasonable cost, by a suitable technique such as wire erosion. The corresponding geometry of the cutting passage 34 in the first and second cutting plates 30, 32, which are also typically formed of tool steel, can also be formed at the same time, again with reasonable ease and at a reasonable cost, by a suitable technique such as wire erosion.

Although the use of tool steel may be advantageous, other electrically conductive materials, metallic or otherwise, can be employed provided that they can be formed, with relative ease by a suitable technique, to provide the cutting member 14 and the first and second cutting plates 30, 32 with the required geometry.

The apparatus 10 includes a cylindrical transfer member 42 which extends through the cylindrical passage 26 in the cutting member 14 and which is linearly displaceable through the passage 26. The purpose of the transfer member 42 is to transfer a cut portion 18 of sealing material from the cutting member 14 to the open top of the container 12 after it has been cut from the web 16 of sealing material by the cutting member 14.

The transfer member 42 is connected to a second actuator 44, typically in the form of a piston arrangement, which is operable independently of the first actuator 22 such that the transfer member 42 is independently linearly displaceable relative to the cutting member 14 through the passage 26. The first and second actuators 22, 44 are arranged so that when the first actuator 22 is operated to displace the cutting member 14, the second actuator 44, and hence the transfer member 42, are correspondingly displaced. Thus, the first actuator 22 when operated provides simultaneous and corresponding linear displacement of both the cutting member 14 and the transfer member 42.

Figure 3:
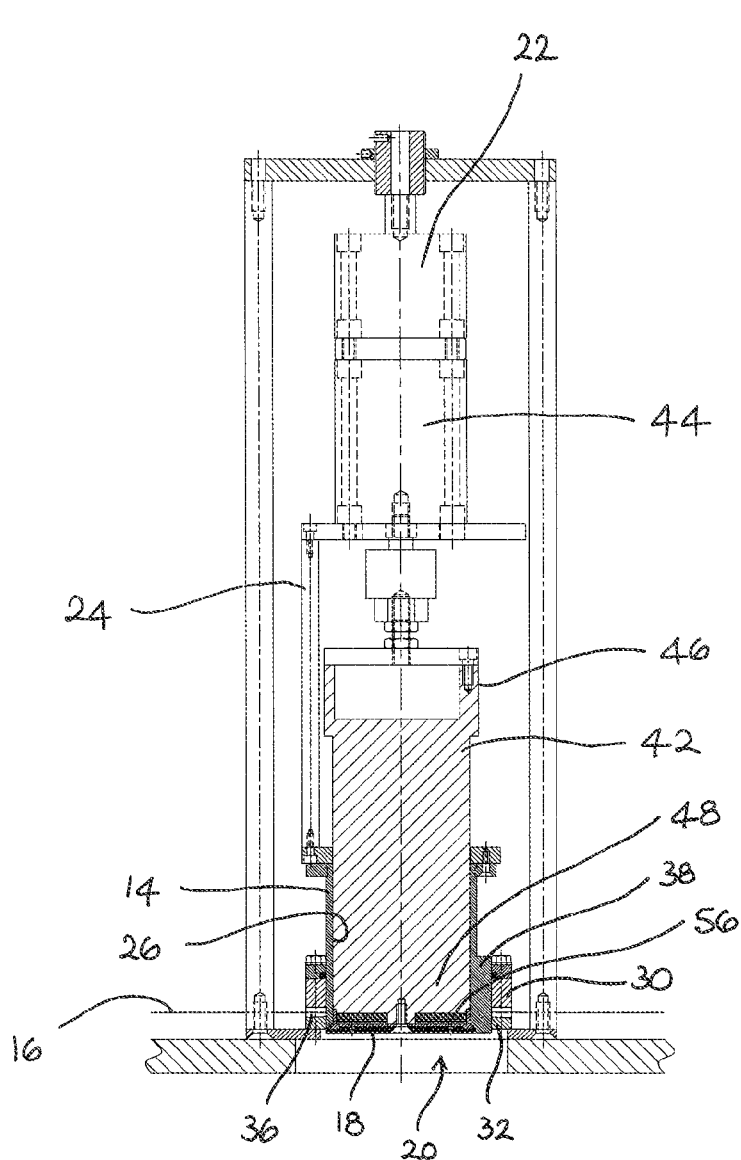
FIG. 3 is a diagrammatic cross-sectional view of the container sealing apparatus of FIG. 1 in a second configuration.

The transfer member 42 is independently displaceable relative to the cutting member 14, by the second actuator 44, from a retracted position shown in FIGS. 1 and 3 to an extended position shown in FIG. 5, and is displaceable, again by the second actuator 44, in the opposite direction from the extended position to the retracted position. The passage 26 through the cutting member 14 effectively acts as a linear bearing to guide the linear displacement of the transfer member 42.

The transfer member 42 includes proximal and distal ends 46, 48. The proximal end 46 is connected to the second actuator 44 and the distal end 48 includes a transfer surface 50. When the transfer member 42 is in the retracted position shown in FIG. 1, the transfer surface 50 is flush with the annular cutting surface 28. Accordingly, the transfer member 42 does not interfere with the operation of the cutting member 14. When the transfer member 42 is moved by the second actuator 44 from the retracted position to the extended position, the transfer surface 50 projects beyond the annular cutting surface 28 and carries the cut portion 18 of sealing material from the annular cutting surface 28 to the container 12 for sealing to the container 12.

Figure 2:
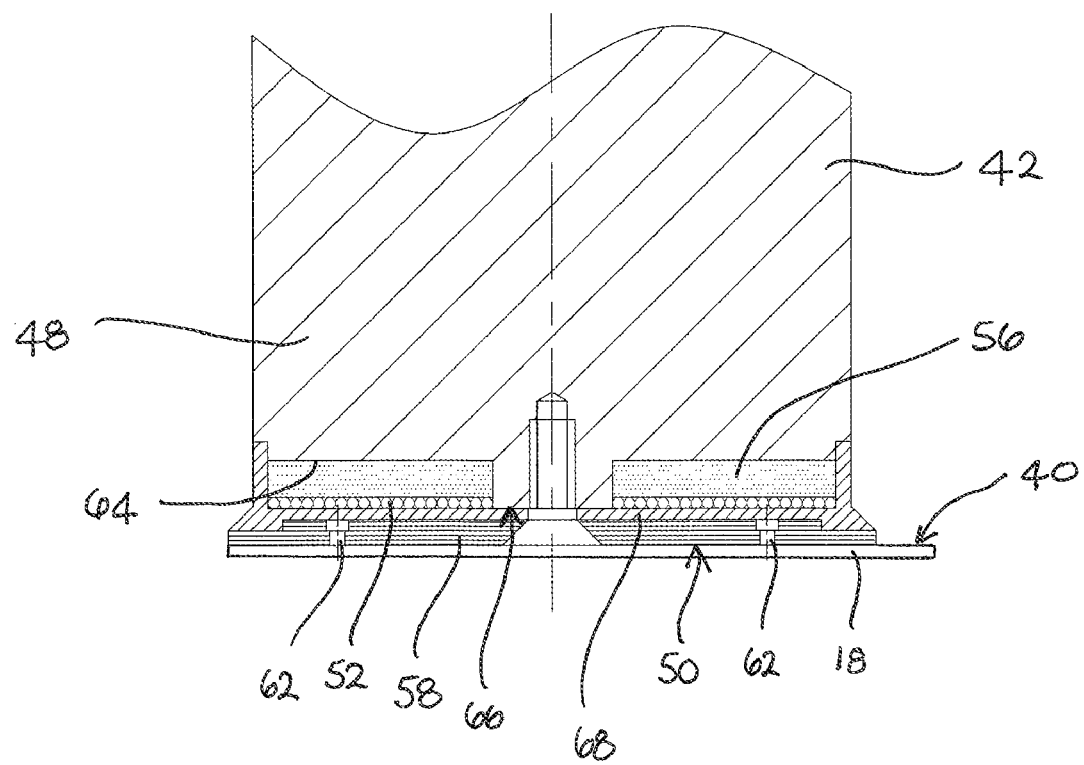
FIG. 2 is an enlarged view of part of a transfer member forming part of the container sealing apparatus of FIG. 1 and carrying a cut portion of sealing material.

The apparatus 10 utilizes induction heating to seal the cut portion 18 of sealing material to the open top of the container 12. As best seen in FIG. 2, an induction coil 52 is provided at the distal end 48 of the transfer member 42 to inductively heat the cut portion 18 of sealing material. As indicated above, in the illustrated embodiment the sealing material comprises an electrically conductive metallic foil and the induction field 54 generated by the induction coil 52, when activated, directly inductively heats the cut portion 18 of electrically conductive, metallic foil, sealing material to enable it to be sealed, by the thermosensitive adhesive, to the open top of the container 12.

In order to prevent the transfer member 42 from being inductively heated by the induction field 54 and thus from thermally expanding, which could prevent it from being freely slidable in the passage 26, the transfer member 42 is formed from an electrically insulating material. Plastics materials are especially suitable, but other electrically insulating materials could be used. In one embodiment, bearing grade PEEK (polyetheretherketone) is used as the electrically insulating material.

In the illustrated embodiment, the transfer member 42 includes a flexible plate member 58 at the distal end 48 to provide the transfer surface 50. The flexible plate member 58 typically comprises an electrically insulating and resiliently deformable material, such as rubber or a rubberized material, which when it comes into contact with the open top of the container 12, deforms to the minimal extent necessary to enable it to conform to the shape of the open top of the container 12. In this way, the cut portion 18 of sealing material is also caused to conform to the shape of the open top of the container 12, thus ensuring that a reliable seal is formed. The use of a flexible plate member 58 is particularly advantageous when the container 12 is formed of a brittle material, such as glass, since the deformation of the resiliently deformable material from which the flexible plate member 58 is formed minimizes the risk that the container 12 will be cracked or otherwise damaged by the transfer member 42.

A field concentrator 56 is also mounted on the distal end 48 of the transfer member 42 adjacent to the induction coil 52 to concentrate the magnetic induction field 54 generated by the induction coil 52 in a desired region, generally around and below the transfer surface 50 and away from the cutting member 14 and the first and second cutting plates 30, 32. By concentrating the induction field 54 away from the cutting member 14 and first and second cutting plates 30, 32, all of which are formed from an electrically conductive material such as tool steel, the field concentrator 56 prevents, or at least minimizes, unwanted induction heating of the cutting member 14 and first and second cutting plates 30, 32, as well as other electrically conductive component parts of the container sealing apparatus 10. The field concentrator 56 thus optimizes the induction heating of the cut portion 18 of electrically conductive, metallic foil, sealing material and this provides a number of advantages.

Firstly, the cutting member 14 and first and second cutting plates 30, 32 are shielded from the induction field 54, meaning that they do not heat up at all or at least not to any significant extent. There is thus no or at least minimal thermal expansion of the cutting member 14 in particular which could cause the cutting member 14 to foul the first and second cutting plates 30, 32 and, thus, compromise the effective operation of the container sealing apparatus 10.

Secondly, by concentrating the magnetic induction field 54 in the region around and below the transfer surface 50 and hence around the cut portion 18 of electrically conductive, metallic foil, sealing material, the amount of energy available for inductively heating the cut portion 18 of sealing material is maximized, thus providing for rapid heating and subsequent cooling of the cut portion 18 of sealing material.

As best seen in FIG. 2, in the illustrated embodiment the field concentrator 56 is generally annular and the induction coil 52 is in the form of a pancake coil mounted below, and directly adjacent to, the induction coil 52. Both the field concentrator 56 and the induction coil 52 are mounted in an annular recess 64 in an end face 66 at the distal end 48 of the transfer member 42 and a securing plate 68 is provided to hold both the field concentrator 56 and the induction coil 52 in the desired position.

It should, however, be understood that a variety of other arrangements and geometries of both the induction coil 52 and field concentrator 56 are possible and within the scope of the present invention. For example, the field concentrator 56 could be generally tubular and a continuation of the distal end 48 of the transfer member 42, with the induction coil 52 extending vertically and around the outside or inside of the field concentrator 56. Ultimately, the arrangement selected will depend on the geometry of the container 12 being sealed and the geometry of the cut portion 18 of sealing material. It is readily within the ability of the skilled person to determine an appropriate arrangement of the induction coil 52 and field concentrator 56.

The field concentrator 56 typically comprises ferrite, but other magnetic materials can be employed. Where ferrite is employed, the field concentrator 56 may be formed from a plurality of ferrite rods, although the optimum construction will depend on the arrangement of the induction coil 52 and field concentrator 56 that is adopted and will be readily deducible by the skilled person.

In operation, a fresh portion of the web 16 of sealing material is advanced into the cutting and sealing region 20 of the container sealing apparatus 10 whilst the cutting member 14 is in the first position and the transfer member 42 is in the retracted position. This first configuration of the apparatus is shown in FIG. 1. As indicated above, the operation of the apparatus 10 is appropriately controlled so that a container 12 to be sealed is advanced into the cutting and sealing region 20 underneath the cutting member 14 and transfer member 42.

Figure 4:
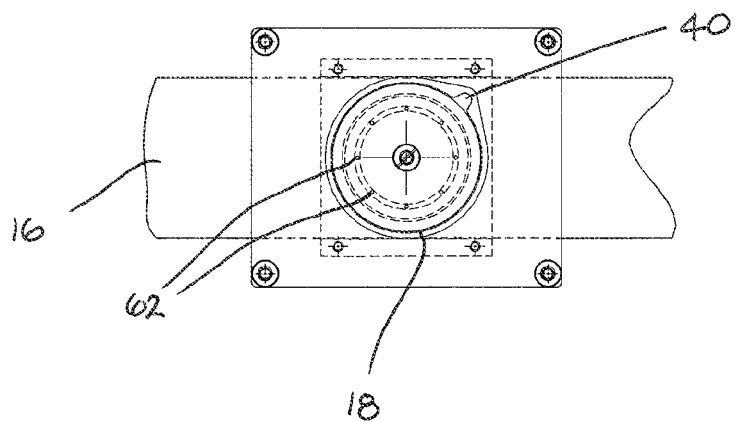
FIG. 4 is a view from below the container sealing apparatus shown in FIG. 3.

The first actuator 22 then moves the second actuator 44 and rigid connecting member 24, and hence the cutting member 14, downwardly from the first position towards the second position. As the cutting member 14 is moved from the first position towards the second position, the annular cutting surface 28 cooperates with the first and second cutting plates 30, 32 and as the annular cutting surface 28 impacts the web 16 of sealing material at a position intermediate the first and second positions, it cuts a portion of sealing material from the web 16 to thereby provide the cut portion 18 of sealing material. The cutting member 14 continues its downward movement, under the action of the first actuator 22, until it reaches the second position at which it is fully extended and at which the cut portion 18 of sealing material is clear of the web 16. This second configuration of the apparatus, in which the cutting member 14 is in the second position, is shown in FIGS. 3 and 4.

At all times during movement of the cutting member 14 from the first position, through the web 16 of sealing material, towards the second position, the transfer member 42 remains in the retracted position, so that the transfer surface 50 is generally flush with the annular cutting surface 28. Once the cutting member 14 has been displaced to the second position shown in FIGS. 3 and 4 and whilst it remains in the second position, the second actuator 44 slides the transfer member 42 through the passage 26 in the cutting member 14 from the retracted position shown in FIG. 3 to the extended position shown in FIG. 5. The transfer member 42, and in particular the transfer surface 50, thus transfers the cut portion 18 of sealing material from the annular cutting surface 28 of the cutting member 14 to the open top, and in particular the rim, of the container 12. The apparatus 10 is appropriately configured so that when the transfer member 42 is in the extended position, it presses the cut portion 18 of sealing material onto the open top of the container 12 with an appropriate amount of force to enable the cut portion 18 of sealing material to be sealed to the open top of the container 12. Suitable deformation of the flexible plate member 58 may occur to ensure that the cut portion 18 of sealing material conforms to the shape of the open top of the container 12.

In order to ensure that the cut portion 18 of sealing material is retained in an appropriately centered position on the cutting member 14 during movement of the cutting member 14 towards the second position, and also on the transfer member 42 as it is moved from the retracted position to the extended position to transfer the cut portion 18 of sealing material to the container 12, the apparatus 10 includes a vacuum arrangement which applies suction to the transfer surface 50. Typically, one or more conduits (not shown) lead to a plurality of circumferentially spaced apertures 62 in the transfer surface 50 through which the suction is applied. Once the transfer member 42 has been displaced to the extended position, it is held in this position for a predetermined period of time to hold the cut portion 18 of sealing material against the open top of the container 12.

Once the cut portion 18 of sealing material has been transferred to the open top of the container 12 by the transfer member 42, the induction coil 52 is activated and produces an induction field 54. This third configuration of the apparatus 10 is shown in FIG. 5. Typically, the induction coil 52 is activated to inductively heat the cut portion 18 of sealing material during an initial portion of the predetermined period of time during which the cut portion 18 of sealing material is held against the open top of the container 12 by the transfer member 42.

As explained above, the induction field 54 is concentrated by the field concentrator 56 in the region of the cut portion 18 of sealing material, as shown by the magnetic field or flux lines denoting the induction field 54 in FIG. 5. Because the field concentrator 56 concentrates the induction field 54 so effectively, thereby shielding the electrically conductive cutting member 14 and other electrically conductive component parts of the apparatus 10 such as the first and second cutting plates 30, 32 from the induction field 54, the displacement of the transfer member 42, when in the extended position, from the cutting member 14 does not have to be significant. For example, a displacement of only a few centimeters or less is typically adequate. The provision of the field concentrator 56 thus provides the advantage that it enables the overall height of the apparatus 10 to be minimized by minimizing the displacement of the transfer member 42 from the cutting member 14.

The induction field 54 rapidly heats the cut portion 18 of electrically conductive, metallic foil, sealing material by directly inductively heating it and the thermosensitive adhesive carried on the underside of the cut portion 18 of sealing material thus melts or softens. The induction coil 52 is then deactivated which causes rapid cooling of the cut portion 18 of the sealing material and resultant cooling and curing of the thermosensitive adhesive. The transfer member 42 continues to hold the cut portion 18 of sealing material against the open top of the container 12 after the induction coil 52 has been deactivated to allow sufficient time for the cut portion 18 of sealing material to cool, and hence the adhesive to cure and seal the cut portion 18 of sealing material to the container 12.

Once the thermosensitive adhesive has suitably cooled and cured, and the cut portion 18 of sealing material has been appropriately sealed to the open top of the container 12, the suction applied to the transfer surface 50 via the apertures 62 is deactivated and the transfer member 42 is displaced, by the second actuator 44, from the extended position shown in FIG. 5 to the retracted position shown in FIG. 3. During this time, the cutting member 14 remains in the second position. Once the transfer member 42 has been displaced to the retracted position, the first actuator 22 displaces the cutting member 14 from the second position shown in FIG. 3 to the first position shown in FIG. 1. The sealing operation is thus complete and the web 16 of sealing material is then advanced to provide a fresh portion of sealing material in the cutting and sealing region 20 whilst a new container 12 to be sealed is advanced into the cutting and sealing region 20 below the cutting member 14 and the transfer member 42. The method described above is then repeated to seal the new container 12.

Although embodiments of the invention have been described in the preceding paragraphs with reference to various examples, it should be understood that various modifications may be made to those examples without departing from the scope of the present invention, as claimed.

For example, the web 16 of sealing material could comprise an electrically insulating sealing material, such as a plastics material, rather than an electrically conductive sealing material. In this case, the electrically insulating flexible plate member 58 would be replaced by an electrically conductive plate member, typically a thin metallic layer having a thickness of 1 mm or less, to provide the electrically insulating transfer member 42 with an electrically conductive transfer surface 50. In such an alternative embodiment, the electrically conductive transfer surface 50 would be inductively heated by the induction field 54 produced by the induction coil 52, with the induction field 54 being appropriately concentrated in the manner described above by the field concentrator 56. Heat generated in the electrically conductive transfer surface 50 by the induction field 54 would then be conducted to the cut portion 18 of sealing material in contact with the transfer surface 50, thus heating the cut portion 18 of sealing material. The sealing material could carry a thermosensitive adhesive which would be heated, and therefore melted or softened, in the manner described above. Alternatively, the sealing material could itself be softened and upon cooling be directly sealed to the open top of the container 12 without the need for a thermosensitive adhesive.

The transfer surface 50 may be slightly recessed from, as opposed to flush with, the annular cutting surface 28 when the transfer member 42 is in the retracted position.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:
1. Container sealing apparatus comprising:
a linearly displaceable cutting member operable to cut a portion of sealing material from a web, the linearly displaceable cutting member comprising an electrically conductive material;
an independently linearly displaceable transfer member extendible relative to the cutting member to transfer the cut portion of sealing material from the linearly displaceable cutting member to an open top of a container to be sealed, the linearly displaceable transfer member comprising an electrically insulating material;

an induction coil which is operable to produce an induction field for heating the cut portion of sealing material, either directly or indirectly, by induction heating to enable the cut portion of sealing material to be sealed to the open top of the container, the linearly displaceable transfer member being operable to hold the cut portion of sealing material against the open top of the container during induction heating; and a field concentrator operable to concentrate the induction field in a desired region away from the linearly displaceable electrically conductive cutting member to optimize the induction heating of the cut portion of sealing material, wherein the field concentrator is mounted on the transfer member.

2. Container sealing apparatus according to claim 1, wherein the induction coil is mounted generally adjacent to the field concentrator.

3. Container sealing apparatus according to claim 1, wherein the transfer member includes a transfer surface for transferring the cut portion of sealing material to the open top of the container.

4. Container sealing apparatus according to claim 3, wherein the field concentrator is arranged to concentrate the induction field in a region generally around the transfer surface.

5. Container sealing apparatus according to claim 3, wherein the transfer surface includes a flexible plate member to enable the transfer surface to conform generally to the shape of the open top of a container when in contact with the container in use.

6. Container sealing apparatus according to claim 3, wherein the apparatus is adapted for use with sealing material comprising an electrically insulating sealing material and the transfer surface comprises electrically conductive material which is arranged to be inductively heated by the induction field produced by the induction coil to indirectly inductively heat the cut portion of electrically insulating sealing material.

7. Container sealing apparatus according to claim 1, wherein the cutting member is generally tubular and includes a passage through which the transfer member is linearly displaceable, relative to the cutting member, between a retracted position and an extended position.

8. Container sealing apparatus according to claim 7, wherein the cutting member includes an annular cutting surface and the transfer member includes a transfer surface that is generally flush with the cutting surface when the transfer member is in the retracted position.

9. Container sealing apparatus according to according to claim 8, wherein the transfer surface projects beyond the cutting surface when the transfer member is in the extended position.

10. Container sealing apparatus according to claim 1, wherein the apparatus includes a holding arrangement operable to hold the cut portion of sealing material on the transfer member during transfer of the cut portion of sealing material to the open top of the container by the transfer member for sealing to the open top of the container.

11. Container sealing apparatus according to claim 1, wherein the apparatus is adapted for use with sealing material comprising an electrically conductive sealing material such that the induction field produced by the induction coil is operable to directly inductively heat the cut portion of electrically conductive sealing material.

12. A method for sealing a container, the method comprising:

cutting a web of sealing material, using a linearly displaceable cutting member formed of electrically conductive material, to provide a cut portion of the sealing material;

transferring the cut portion of sealing material to an open top of a container to be sealed by extending an independently linearly displaceable transfer member relative to the linearly displaceable cutting member, the linearly displaceable transfer member comprising an electrically insulating material;

inductively heating the cut portion of sealing material, either directly or indirectly, to seal the cut portion of sealing material to the open top of the container whilst held against the open top of the container by the transfer member;

wherein the step of inductively heating the cut portion of sealing material comprises producing an induction field using an induction coil and concentrating the induction field, using a field concentrator mounted on the transfer member, in a desired region away from the linearly displaceable electrically conductive cutting member to optimize the induction heating of the cut portion of sealing material.

13. A method according to claim 12, wherein the induction heating step comprises concentrating the induction field in a desired region generally around the cut portion of sealing material.

14. A method according to claim 12, wherein the method comprises linearly displacing the cutting member from a first position to a second position to cut the web of sealing material and provide the cut portion of sealing material.

15. A method according to claim 14, wherein the method comprises extending the transfer member relative to the cutting member when the cutting member is in the second position, to thereby transfer the cut portion of sealing material to the open top of the container.

16. A method according to claim 15, wherein the method comprises maintaining the transfer member in the extended position for a predetermined period of time.

17. A method according to claim 16, wherein the method comprises activating the induction coil to inductively heat the cut portion of sealing material, either directly or indirectly, during an initial portion of the predetermined period of time and thereafter deactivating the induction coil during the remainder of the predetermined period of time.

18. A method according to claim 15, wherein the method comprises positively holding the cut portion of sealing material on the transfer member during transfer of the cut portion of sealing material to the open top of the container by the transfer member.

19. Container sealing apparatus comprising:— a linearly displaceable cutting member operable to cut a portion of sealing material from a web, the linearly displaceable cutting member comprising an electrically conductive material;

an independently linearly displaceable transfer member extendible relative to the cutting member to transfer the cut portion of sealing material from the linearly displaceable cutting member to an open top of a container to be sealed, the linearly displaceable transfer member comprising an electrically insulating material;

an induction coil which is operable to produce an induction field for heating the cut portion of sealing material, either directly or indirectly, by induction heating to enable the cut portion of sealing material to be sealed to the open top of the container, the linearly displaceable transfer member being operable to hold the cut portion of sealing material against the open top of the container during induction heating; and a field concentrator operable to concentrate the induction field in a desired region away from the linearly displaceable electrically conductive cutting member to optimise the induction heating of the cut portion of sealing material;

wherein the transfer member includes a transfer surface for transferring the cut portion of sealing material to the open top of the container and the field concentrator is arranged to concentrate the induction field in a region generally around the transfer surface.

20. Container sealing apparatus according to claim 19, wherein the transfer member includes a distal end at which the transfer surface is provided and both the field concentrator and the electrical induction coil are positioned generally at or towards the distal end of the transfer member.

21. Container sealing apparatus comprising:— a linearly displaceable cutting member operable to cut a portion of sealing material from a web, the linearly displaceable cutting member comprising an electrically conductive material;

an independently linearly displaceable transfer member extendible relative to the cutting member to transfer the cut portion of sealing material from the linearly displaceable cutting member to an open top of a container to be sealed, the linearly displaceable transfer member comprising an electrically insulating material;

an induction coil which is operable to produce an induction field for heating the cut portion of sealing material, either directly or indirectly, by induction heating to enable the cut portion of sealing material to be sealed to the open top of the container, the linearly displaceable transfer member being operable to hold the cut portion of sealing material against the open top of the container during induction heating; and a field concentrator operable to concentrate the induction field in a desired region away from the linearly displaceable electrically conductive cutting member to optimise the induction heating of the cut portion of sealing material;

wherein the transfer member includes a transfer surface for transferring the cut portion of sealing material to the open top of the container and the transfer surface includes a flexible plate member to enable the transfer surface to conform generally to the shape of the open top of a container when in contact with the container in use.

* * * * *